United States Patent [19]

Scheibenreif

[11] Patent Number: 4,547,027
[45] Date of Patent: Oct. 15, 1985

[54] MODULAR SWIVEL CONNECTOR

[75] Inventor: John A. Scheibenreif, Phoenix, Ariz.

[73] Assignee: ITT Corporation, New York, N.Y.

[21] Appl. No.: 582,101

[22] Filed: Feb. 21, 1984

[51] Int. Cl.$^4$ ............................................. H01R 35/00
[52] U.S. Cl. ..................................... 339/8 R; 248/349
[58] Field of Search ................... 339/8 R, 8 P, 5 R, 7;
248/346, 349

[56] References Cited

U.S. PATENT DOCUMENTS 3,462,112 8/1969 von Brack et al. ................. 248/349

Primary Examiner—Eugene F. Desmond
Attorney, Agent, or Firm—T. L. Peterson; J. M. May

[57] ABSTRACT

The monitor screen housing of a CRT type computer terminal forms a monitor module; the base thereof housing the power supply and the electrical interface to other computer equipment forms a base module. The two modules are mechanically and electrically connected to one another in such a way that the monitor module may be supported by and swiveled with respect to the base module and yet may be readily disconnected therefrom. The base module is provided with a raised central region which includes an electrical connector and a circular locking ring having a plurality of horizontally projecting teeth. The monitor module is provided with a recessed central region which includes an electrical connector complementary to that of the base module and a circular locking ring having horizontally projecting teeth that fit between those of the base module only when the base and monitor modules have a predetermined orientation. At least one of the two electrical connectors is permitted to rotate with respect to its corresponding locking ring. When the two modules are disconnected, but oriented above one another with the two teeth of the two rings aligned to fit between one another, the two electrical connectors are also aligned with each other. This assures that, when the monitor module is lowered onto the base module, the two electrical connectors matingly engage at the same time the two locking rings are brought into their operative position.

9 Claims, 9 Drawing Figures

MODULAR SWIVEL CONNECTOR

FIELD OF THE INVENTION

The invention relates generally to mechanical and electrical connectors, and more particularly to a novel apparatus for effecting both the mechanical and the electrical connection of two modules which additionally allows the one module to be swiveled with respect to the other and which also permits the two modules to be readily electrically and mechanically connected and disconnected.

CROSS REFERENCE TO RELATED APPLICATIONS

Commonly assigned U.S. design patent application Ser. No. 556,489 filed on Nov. 30, 1983 and entitled "VIDEO TERMINAL" discloses an industrial design for a CRT terminal module in which the present invention may be advantageously employed.

BACKGROUND ART

Cathode ray tube (CRT) terminals are becoming an ever increasingly popular means of communicating with computers and computerized data banks. Accordingly, in many computerized work environments, each individual work station is provided with its own CRT terminal.

In the past it was standard practice to mount the CRT and its associated electronic drive circuits inside a more or less rectangular cabinet that could be placed on the flat horizontal surface of a desk or other work surface. More recently, on account of an increased awareness of the effects or ergonomics on the efficiency of the human operator, CRT terminals have been provided with a mechanism whereby the angular orientation of the screen could be adjusted both about a vertical swivel axis and a horizontal tilt axis in order to better accommodate the needs and desires of different operators. U.S. Pat. No. 4,304,385 is considered to be exemplary of such prior art tilt and swivel mechanisms. In the particular device disclosed by that patent, the cable connecting the CRT terminal to supporting equipment such as a computer is passed through a conduit defined by the interior of the tilt and swivel mechanism. U.S. Pat. Nos. 3,067,976; 3,131,980; 3,701,073 and 4,106,830 disclose exemplary prior art mechanisms for adjustably supporting a television receiver or other electrically energizable apparatus, with the latter two patents teaching alternate ways of effecting external electrical connections to the electrical apparatus supported by the stand.

In addition to good operator ergonomics, electronic apparatus intended for field use must be maintained in proper working order and to this end complex equipment is desirably formed from field-replaceable modules.

SUMMARY OF THE INVENTION

The monitor screen housing of a CRT type video computer terminal forms a monitor module; the base thereof housing the power supply and the electrical interface to other computer equipment forms a base module. The two modules are mechanically and electrically connected to one another such that, in use, the monitor module may be supported by and swiveled with respect to the base module; furthermore, the two modules may be readily disconnected mechanically and electrically from one another when required for the purposes of maintenance. The base module is provided with a raised central plateau portion provided with first polarized electrical connecting means. Surrounding the central plateau portion is a circular locking ring having a plurality of horizontally projecting teeth. The monitor module is provided with a lower plate which includes a connector configuration generally complementary to that of the base plate, including second polarized electrical connecting means adapted to be connected to the corresponding means of the base module and a second locking ring having teeth projecting in the opposite direction to the locking ring teeth of the base module and adapted to be lockingly engageable therewith.

Preferably, the two modules are provided with first and second stop means for limiting the swiveling of the monitor module with respect to its base module to a predetermined angular extent and the disposition of the horizontally projecting teeth about their corresponding locking rings is such that they at least partially overlap in the vertical plane during any of the permitted angular rotation therebetween. At least some portion of the teeth on the monitor module are normally disposed directly below some portion of the teeth of the base module so that the two sets of teeth do not interfere with one another but nevertheless overlap so that the monitor module may be swiveled about the base while preventing the monitor module to be separated from the base module during normal use. By making the first stop means movable, for maintenance the monitor module may be further rotated to a mating position defined by a third stop means at which the two sets of teeth do not so overlap and, accordingly, the two modules may be mechanically separated from one another.

In order to maintain electrical continuity between the various circuits of the base module and the monitor module as they are swiveled with respect to each other, at least one of the two polarized electrical connection means is permitted to rotate with respect to its corresponding locking ring. However, a spring detent means is preferably included so as to maintain the electrical connection means in a predetermined fixed position relative to the locking ring such that when the two modules are disconnected but oriented above one another with the two sets of teeth aligned in their mating position, the two electrical connection means are also aligned with their respective polarization means so that as the monitor module is lowered onto the base module the two electrical connection means matingly engage at the same time the two locking rings are brought into their operative position.

BRIEF DESCRIPTION OF THE DRAWING

For a better understanding of the present invention as exemplified by a presently preferred embodiment, reference is made to the several figures of the appended Drawing in which.

DETAILED DESCRIPTION OF A PREFERRED EMBODIMENT

Figure 1:
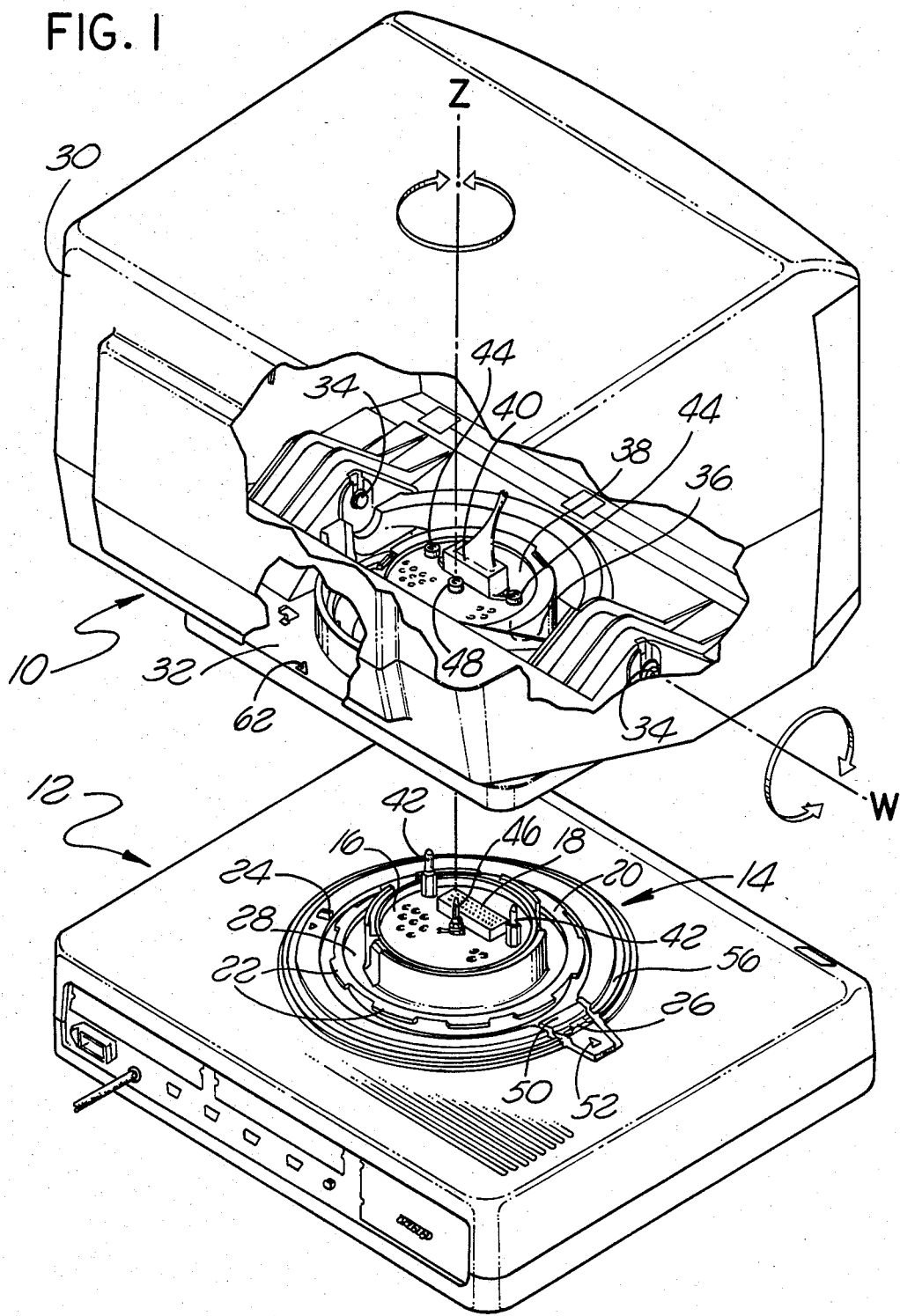
FIG. 1 is an exploded partially cutaway isometric view showing the normal orientation of the monitor module with respect to the base module and also indicating how the monitor module may be tilted and swiveled with respect to the base module about respective tilt and swivel axes.

Reference should now be made to the figures in which like reference numbers designate like elements, and in particular to FIG. 1 which shows a presently preferred embodiment of the present invention in use with a monitor module 10 removably and swivelably mounted to a base module 12. In the figure, the letter Z refers to the vertical axis about which the monitor module 10 swivels with respect to the base module 12 and the letter W designates the monitor's horizontal tilt axis.

Still referring to FIG. 1, it will be seen that the base module 12 is provided with a lower connector subassembly 14 of generally circular configuration including a raised central plateau 16 supporting a multi-circuit electrical connector 18 and also a lower locking ring 20 provided with a plurality of outwardly facing horizontal teeth 22 each radially oriented with respect to the vertical axis Z. Also visible in FIG. 1 is a fixed stop 24 and a displacable stop 26 as well as a lower annular load bearing surface 28.

As shown in FIG. 1, the monitor module 10 comprises an outer cover housing 30 and a lower tilt and swivel plate 32 connected thereto by means of axle pins 34 oriented along the monitor's tilt axis W. Preferably, there is also included suitable friction and/or spring means (not shown in the Figures) to maintain the desired tilted orientation of the outer cover 30 relative to the tilt and swivel plate 32, even with a relatively front-heavy cathode ray tube (not shown in the Figures) mounted inside the cover housing 30. The monitor module's tilt and swivel plate 32 is provided with an upwardly extending connector recess 36 oriented about the vertical axis Z and dimensioned so as to accept the upwardly extending connector plateau 16 of the base module 12. Rotatably secured to the plate's upwardly extending recess portion 36 is a circular metal disk 38 to which is attached a connector assembly 40 of a type that will matingly engage (and make respective electrical contacts to the corresponding circuits carried by) the lower electrical connector 18.

The lower connector subassembly 14 is also provided with a pair of relatively rigid upwardly extending locating lugs 42 which engage correspondingly apertured bosses 44 attached to the rotating disk 38, as well as a ground plug 46 which makes grounding contact to the aforesaid rotating disk 38 (and any components inside the monitor housing electrically connected thereto) via a ground socket 48.

Figure 2:
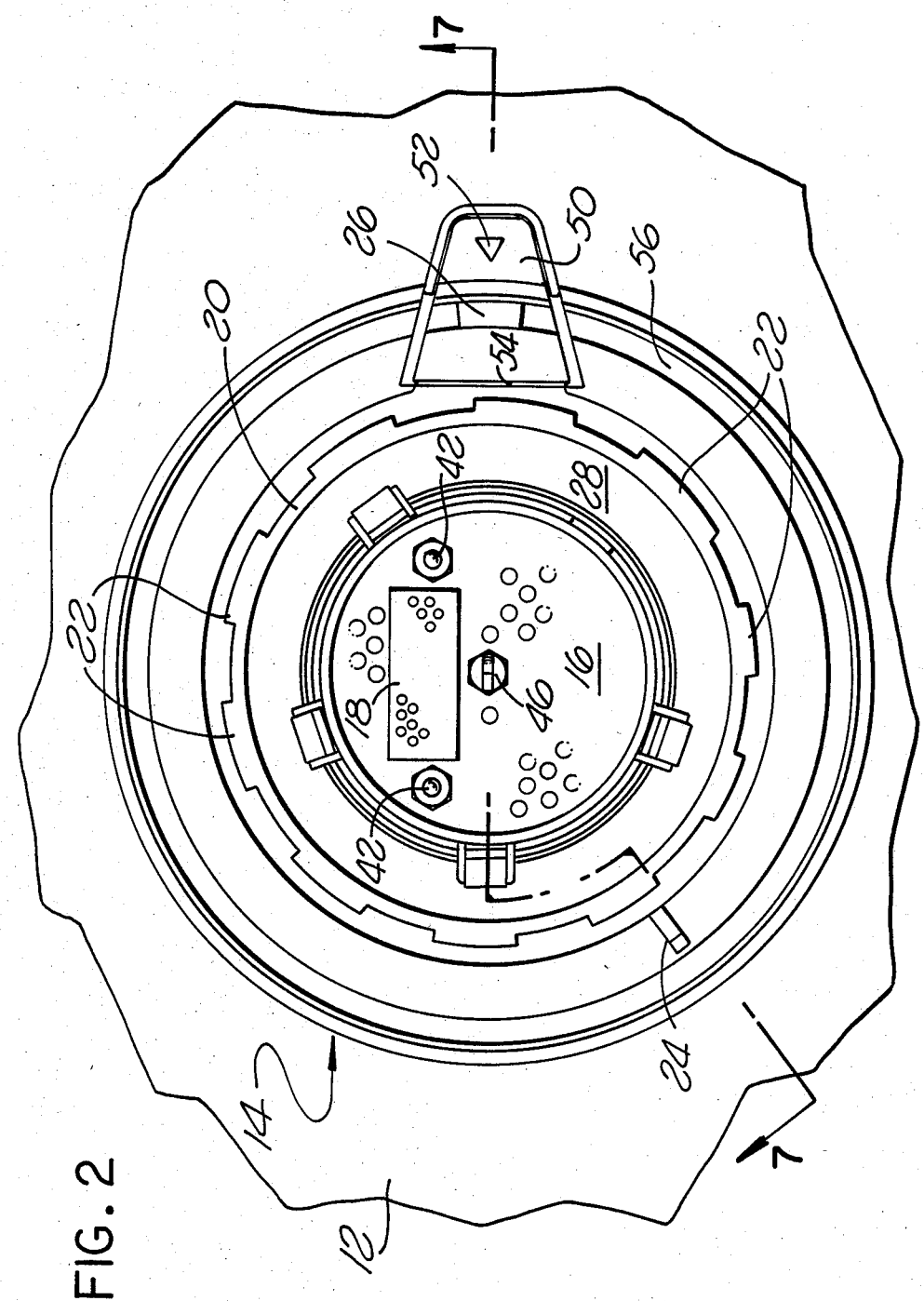
FIG. 2 is a top elevational view of the connector portion of the base module.

FIG. 2 is an enlarged plan view of the connector subassembly portion 14 of the base module 12 as seen from above. Referring to this figure, it may be seen that the lock ring 20 comprises a total of 10 outwardly projecting teeth 22 of varying angular extent. The displaceable stop 26 is supported by a flexible finger 50 that extends outwardly from the connector subassembly 14 and bears an index marking 52 in the shape of an inwardly oriented triangle. The inner edge 54 of the flexible finger 50 is hingedly attached to the base module 12. Thus, when the outer portion of the finger 50 is depressed downwardly in the vicinity of the index mark 52, the displaceable stop 26 is lowered to the level of an annular trough 56 (see also FIG. 7, the lower portion of which being a cross section through the connector subassembly of FIG. 2 as indicated by the arrow 7—7).

Figure 3:
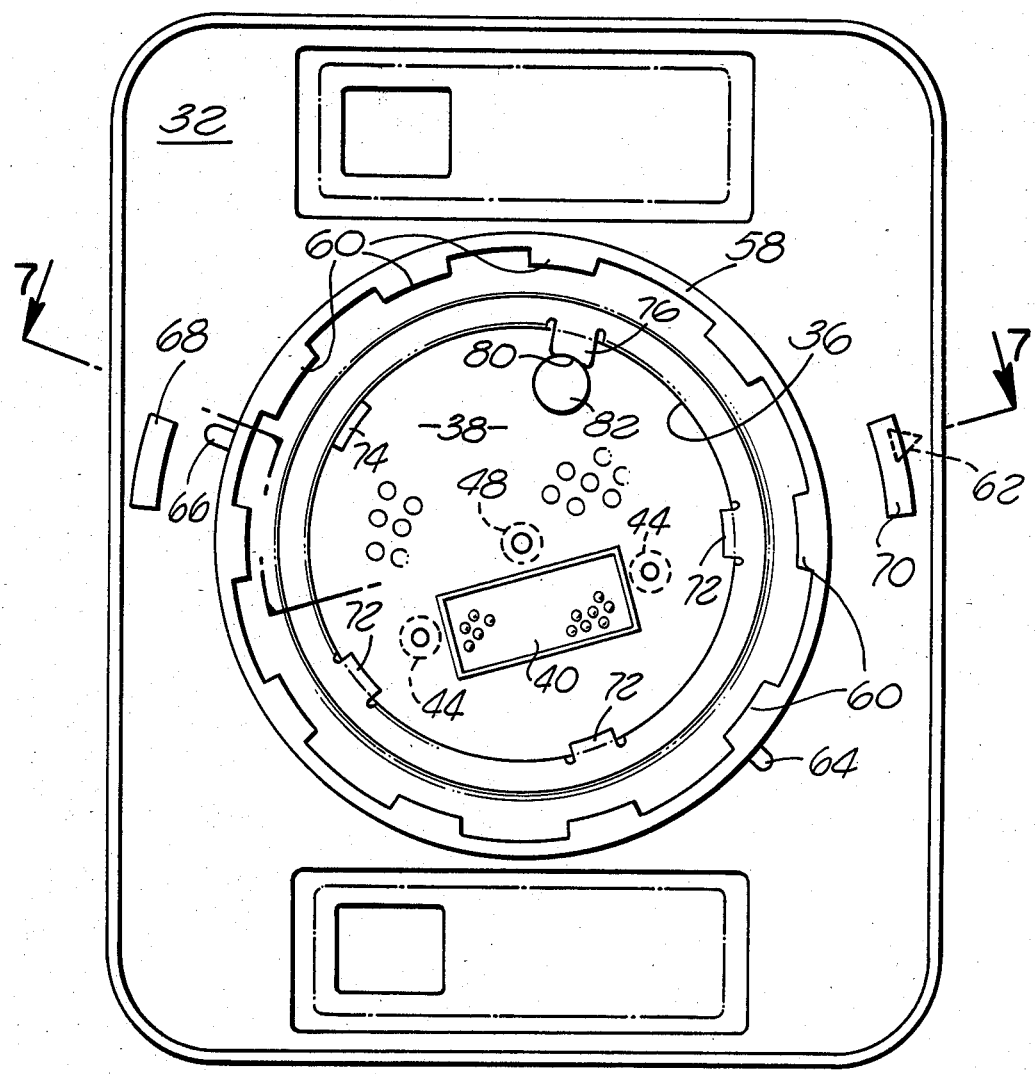
FIG. 3 is a bottom elevational view showing the connector portion of the monitor module and its associated tilt and swivel plate as seen from below.

Reference should now be made to FIG. 3 which is a plan elevational view of the tilt and swivel plate 32 (which is normally attached to the monitor housing 30 by means of axles 34 as shown in FIG. 1) as seen from below. From FIG. 3 it will be seen that the recessed area 36 which accommodates the raised plateau area 16 of the lower connector subassembly 14 is surrounded at its lower end by a circular locking ring 58 comprising 10 inwardly directed teeth 60 (see also the upper portion of FIG. 7). Comparing FIGS. 2 and 3, it may be seen that the spacing and angular extent of the teeth 60 of the upper lock ring 58 are complementary to the corresponding spacing and angular extent of the teeth 22 of the lower lock ring 20, such that the two sets of teeth will not interfere with one another only at one particular orientation of the upper lock ring 58 relative to the lower lock ring at 20, namely, when the index mark 52 associated with the lower connector subassembly 14 is radially aligned with a corresponding outwardly directed index triangle 62 provided on the upper surface of the tilt and swivel plate 32 (see also FIG. 6).

Also visible in FIG. 3 are a pair of inner fixed stops 64, 66 which coact with the fixed stop 24 of the lower connector subassembly (see FIGS. 1 and 2) to limit the maximum rotation of the tilt and swivel plate 32 relative to the base module 12 to approximately 195°. Also visible in FIG. 3 are an outer pair of downwardly projecting fixed stops 68, 70 which coact with the upwardly directed displaceable stop 26 of the lower connector subassembly 14 to limit the normal swivel range of the monitor module 12 relative to the base module 10 to only 180°.

Figure 4:
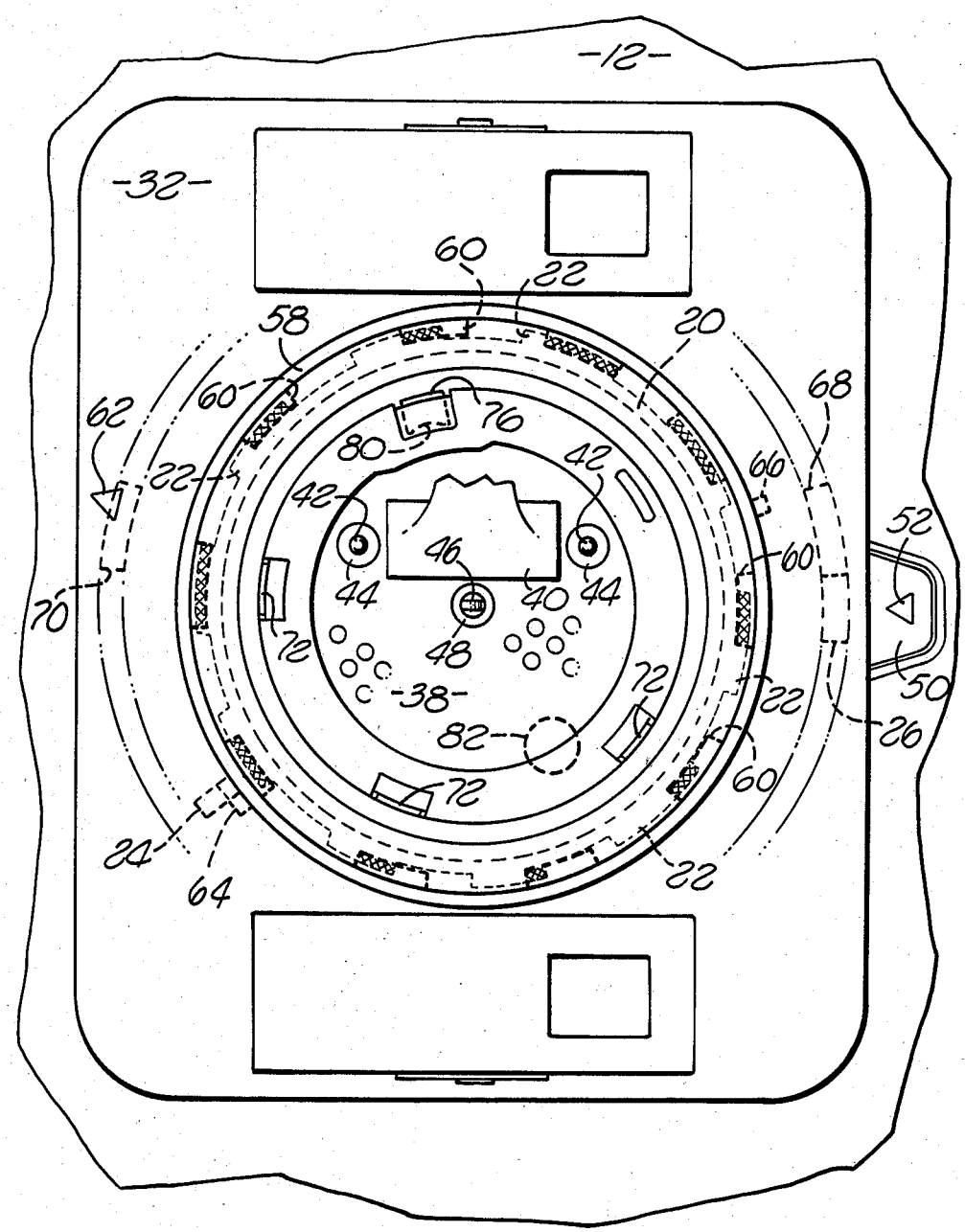
FIG. 4 is a plan view looking downwardly from above the tilt and swivel plate showing the two connectors coupled together when the monitor module is swiveled to its maximum clockwise extent as established by a first stop means.
Figure 5:
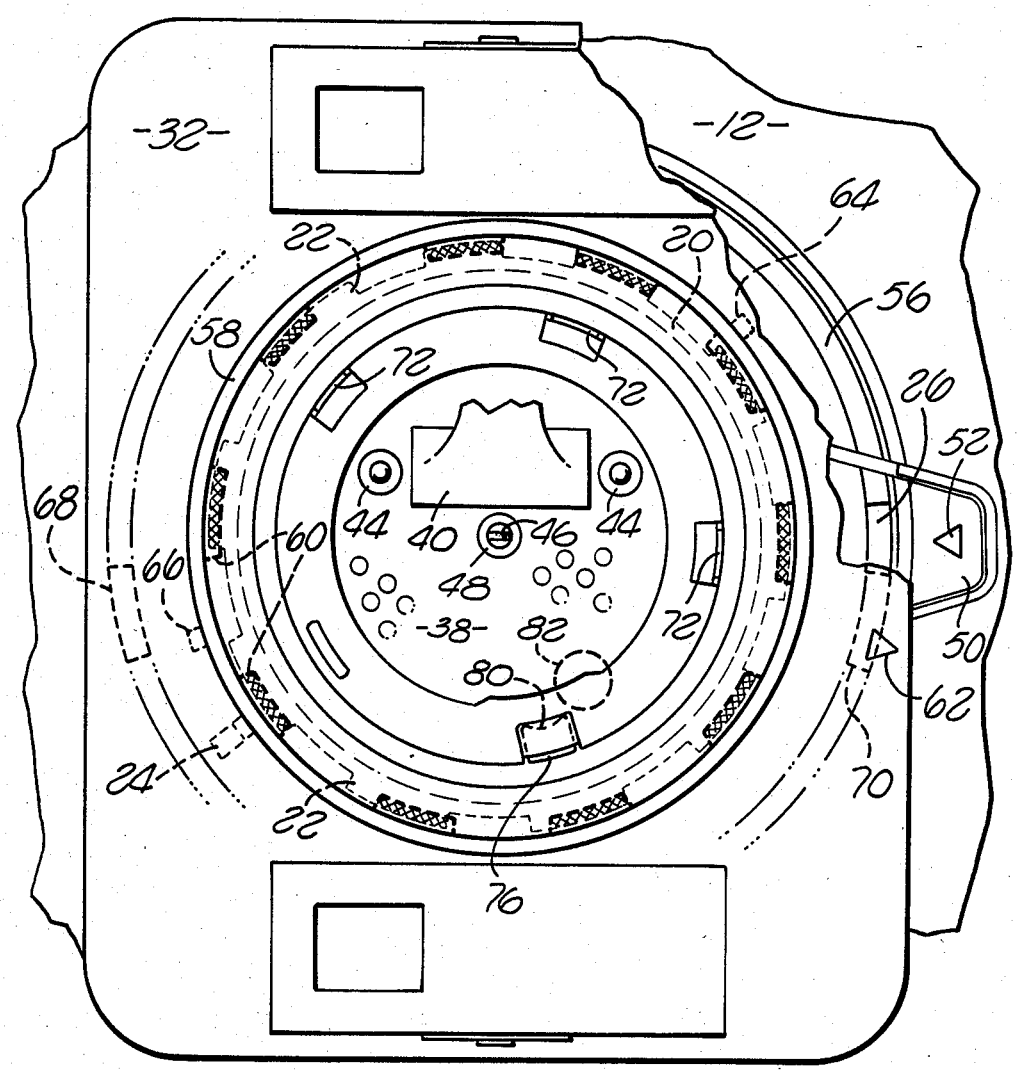
FIG. 5 is generally similar to FIG. 4 but shows the monitor module rotated 180° counterclockwise from the position shown in FIG. 4 to the position established by a movable second stop means.
Figure 6:
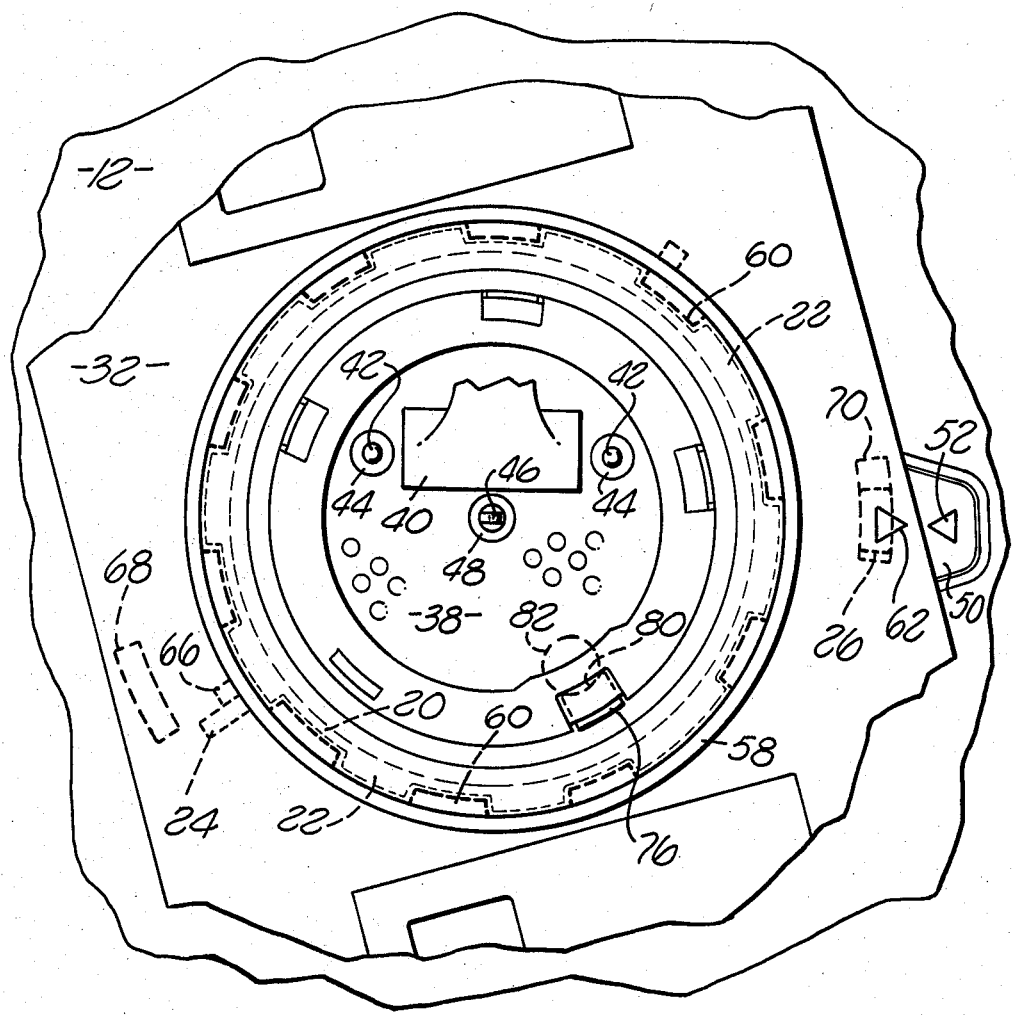
FIG. 6 is generally similar to FIGS. 4 and 5 but shows the monitor module rotated fully counterclockwise to the position established by a third fixed stop means whereat the two modules may be readily disconnected from each other.

Reference should now be made to FIGS. 4, 5 and 6 which respectively show the orientation of the tilt and swivel plate 32 relative to the connector portion 14 of the base module 12 when the monitor module is: (FIG. 4) swiveled to its maximum clockwise extent, (FIG. 5) rotated 180° counterclockwise therefrom (its normal maximum counterclockwise extent), and (FIG. 6) rotated to its fully counterclockwise position whereat the two modules may be readily disconnected from each other. It should be noted that all three of these Figures are plan views looking downwardly from above the tilt and swivel plate. Thus, the tilt and swivel plate 32 seen in FIGS. 4, 5 and 6 appears to be the mirror image of what is depicted in FIG. 3 since FIG. 3 shows the tilt and swivel plate 32 as seen from below. Moreover, both the outwardly directed teeth 22 of the base connector subassembly 14 and the inwardly directed teeth 60 of the tilt and swivel plate 32 are shown in dashed outline since both sets of teeth are below the upper surface of the tilt and swivel plate 32. To further aid in the understanding of FIGS. 4, 5 and 6, the portion of the outwardly facing teeth 22 that actually overlaps the inwardly facing teeth 60 is indicated by light crosshatching and the base module's teeth 22 and their associated lock ring 20 are shown in lighter dashed outline, while the swivel plates teeth 60 and their respective locking ring 58 are shown in heavier dashed outline.

Referring once again to FIG. 3, it will be seen that the rotatable disk 38 is held in place inside the upwardly extending recess 36 by means of three flexible fingers 72 integrally molded inside recess 36, as well as by a fixed protrusion 74 and an elongated flexible finger 76. To install the disk 38, one edge thereof is placed under the fixed finger 74 and the elongated flexible finger 76 as the opposite edge is eased in position over the three short flexible fingers 72, thus temporarily deflecting the three short fingers into an outward retracted position until the disk 38 is resting against the inner annular surface 78 (FIG. 7) of the recess 36 and the three short flexible fingers 72 have thus snapped back to their normal position shown in the Figures.

Still referring to FIG. 3, it will be seen that the elongated flexible finger 76 is provided with an inwardly facing concave surface 80 and is thereby adapted to engage a circular locating boss 82 fixedly mounted to the disk 38 at a predetermined point adjacent its periphery. By this means the rotatable disk 38 may be retained in a predetermined angular position relative to the tilt and swivel plate 32. This predetermined position is such that the upper connector assembly 40 is aligned with the lower connector assembly 18 fixedly positioned relative to the base of module 12 when the alignment arrow 62 molded on the upper surface of the tilt and swivel plate 32 is aligned with the corresponding index mark 52 integrally molded on the flexible finger 50 provided as part of the upper surface of the base module 12.

It should be noted that FIGS. 3 and 6 both show the rotatable plate 38 in the aforedescribed predetermined position relative to the swivel plate 32 with FIG. 3 showing the assembly from below and FIG. 6 showing it from above. By way of contrast, FIGS. 4 and 5 show the rotating plate 38 rotated from said predetermined position with FIG. 4 showing the relative position of the plate 38; however, the fixed locating boss 82 attached thereto remains in the same angular position relative to the base module 12 and, in particular, to the index mark 52, since the upper connector assembly 40 is shown connected to the lower connector assembly 18 which latter is fixed in position relative to the base module 12 by means of an index projection molded into the plateau portion which engages a corresponding notch provided in the periphery index of the plateau 16 to which the connector 18 is fastened.

FIG. 4 shows the tilt and swivel plate rotated to its maximum permitted clockwise extent with the first fixed inner stop 64 of the tilt and swivel plate in contact with the fixed first stop 24 on the base module 12 and with the downwardly projecting first fixed outer stop 68 of the tilt and swivel plate in contact with the movable second stop 28 on the base (which collectively function as a first stop means). In a similar manner, FIG. 5 shows the tilt and swivel plate 32 rotated to the full counterclockwise extent of its normal travel with the downwardly protruding second fixed outer stop 70 in contact with the upwardly extending movable second stop 76 (which collectively function as a second stop means). Comparing FIGS. 4 and 5, it will be seen that the tilt and swivel plate 32 (and therefore the monitor housing 10 attached thereto) can be rotated approximately 180° relative to the base module 12. As shown in FIG. 6, a further 15° of counterclockwise movement is possible, when flexible finger 50 is depressed to permit the downwardly protruding second outer stop 70 to pass over the movable second stop 26 on the base module 12. Movement beyond this further 15° is prevented by the second fixed inner stop 66 of the tilt and swivel plate 32, as the latter makes contact with the fixed first stop 24 on the base module, as shown in dashed outline in FIG. 6. It will therefore be seen that the latter two stops (24 and 66) collectively function as a third stop means. It will also be seen that in this position the second outer stop 70 of the tilt and swivel plate 32 remains above the movable second stop 26 on the base module 12 and the respective alignment indicators 62 and 52 are pointing to each other.

Figure 7:
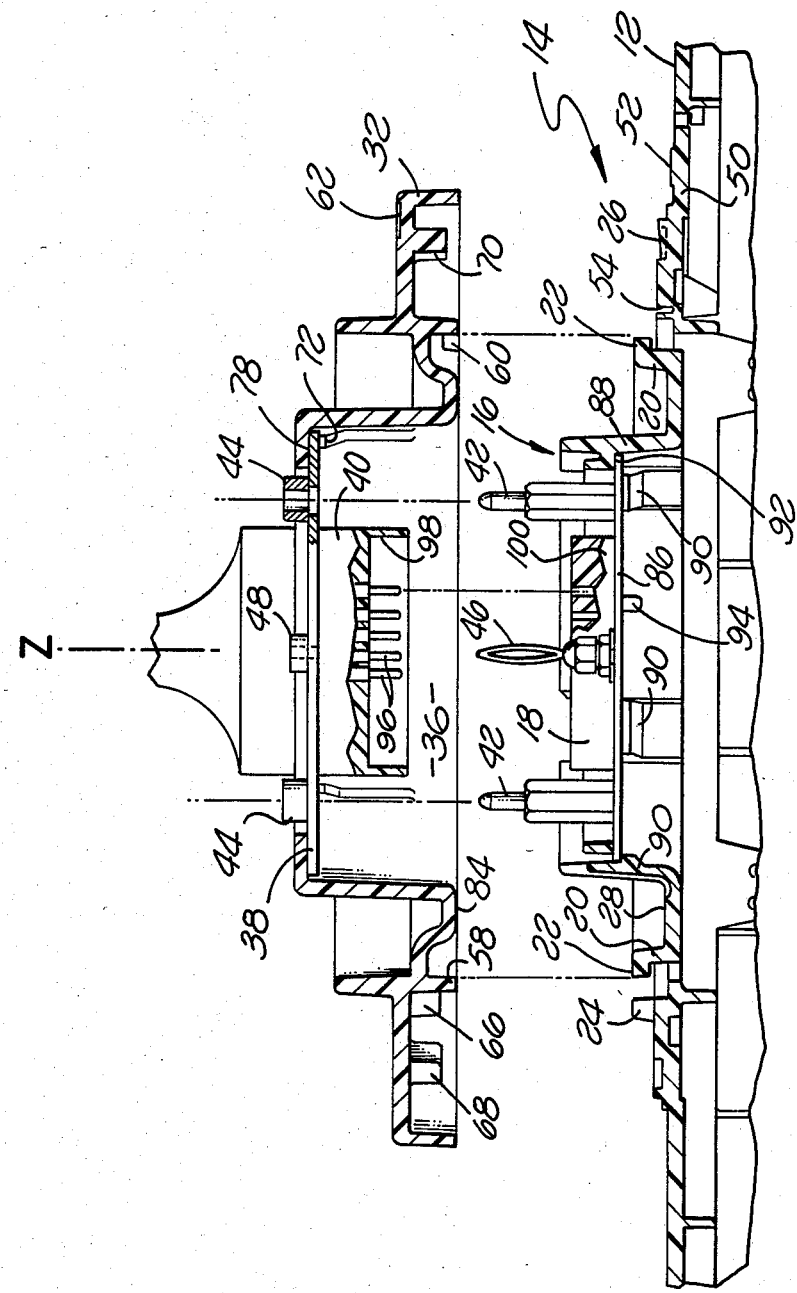
FIG. 7 is a side cross-section view through the two halves of the connector assembly taken from the direction generally indicated by the arrows 7—7 in FIGS. 2 and 3.
Figure 8A:
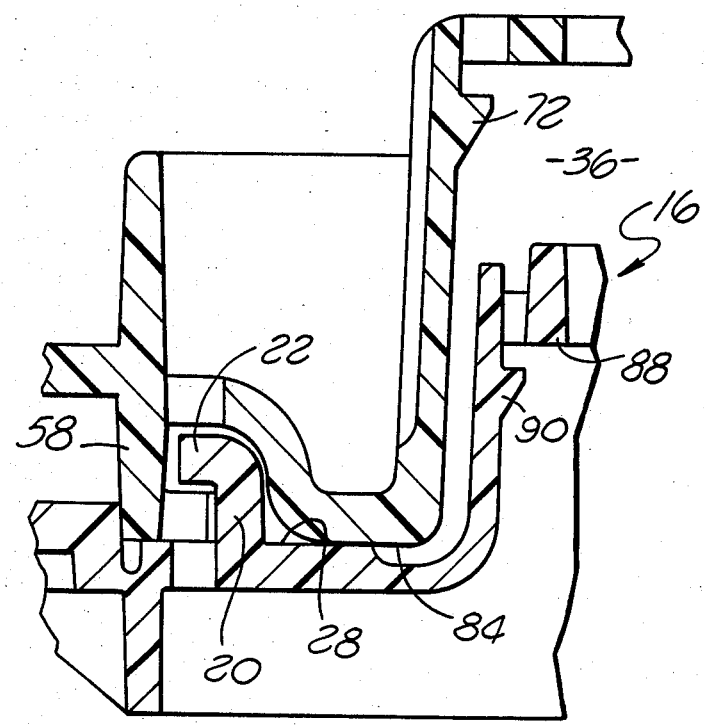
FIGS. 8a and FIG. 8b are detailed cross-sectional views showing how the horizontally projecting teeth provided as part of the upper and lower connector subassemblies may be rotated to respective unlocked and locked positions.
Figure 8B:
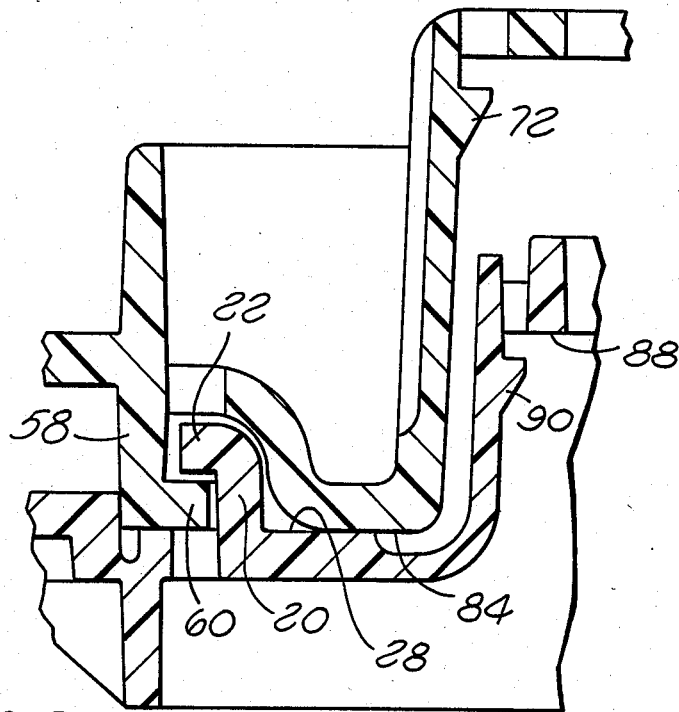

Referring now specifically to FIGS. 7 and 8 (the latter comprising the two individual FIGS. 8a and 8b), it will be noted that the upwardly extending recess 36 molded into the central portion of the tilt and swivel plate 32 has an inner diameter only slightly larger than that of the outer diameter of the plateau portion 16 standing upwardly from the central portion of the base 12, and that the lowermost vertical extent of the recess portion 36 is terminated by a surrounding lower annular surface 84 which normally rests against the recessed annular bearing surface 28 of the lower connector subassembly 14.

It will also be seen that the raised plateau portion of the base module 12 comprises a generally horizontally extending circular platform 86 which is secured at approximately the midpoint of a vertically extending cylindrical ring 88 that is integrally molded with the base 12 and which in turn comprises a plurality of flexible locking fingers 90 that cooperate with a molded annular ledge 92 to hold the plate 86 in position, the plate being secured against rotation by means of an inwardly projecting tab 94 which cooperates with a suitably shaped notch (not visible in the figures) provided at the periphery of the disk 86. The lower electrical connector subassembly 18 is mounted on the lower surface plate 86 with the dimensions of the various elements being such that it is entirely below the upper edge of the vertical ring 88. Furthermore, the upper contact subassembly 40, although extending downwardly from the rotatable disk 38, has a vertical dimension relative to that of the cylindrical recess 36 that its lowermost extent is well above the lower supporting annular surface 84. Thus, not only do the plateau portion 16 of the base 12 and the recess 36 of the tilt and swivel plate 32 cooperate to coarsely align the two modules as the monitor is being lowered onto the base, but they also serve to protect their respective electrical connector subassemblies 18 and 40 from the possibility of bent connector pins and other undesired consequences of improper alignment during the installation of the monitor module onto the base module or in the event that the monitor module is being temporarily set down on a surface not specifically designed to hold the monitor module, such as the flat surface of a workbench.

The two alignment pins 42 protrude sufficiently above the remainder of the plateau 16 that they serve as a second alignment means between the base module and the monitor module to effect a more precise alignment than that which would result upon reliance only on the shape of the plateau and the recess. The pins 42 also serve to ensure that the plate 38 is in the proper angular orientation with respect to the vertical axis Z, and when the two modules have been assembled to one another, they also carry most of the torque resulting from the swiveling of the one module with respect to the other which otherwise would have to be transmitted by the electrical connector itself. It will be noted that the electrical circuit carrying pins 96 contained in the upper electrical connector assembly 40 are contained within a protective recess 98 which is just slightly larger than the corresponding exposed portion 100 of the lower connector assembly 18. Such an arrangement further protects against the deleterious effects of any misalignment of the two connector subassemblies during the installation of the monitor module onto the base module.

Referring to FIG. 8, which is an enlarged cross sectional view of the upper and lower locking rings 20 and 58, it will be seen that the outwardly extending teeth 22 on the lower locking ring 20 have a maximum diameter slightly less than the inner diameter of the upper locking ring 58 of those portions of the inner diameter of the upper locking ring 58 not provided with teeth (see FIG. 8a). A similar situation holds for the teeth 60 on the upper locking ring 58 and the minimum inner diameter of the teeth 60 on the upper locking ring 58 relative to the outer diameter of the plain portions of the lower locking ring 20.

As shown in FIG. 8b, when the lower annular thrust surface 84 of the swivel plate 32 is resting on the annular bearing surface 28 of the lower connector subassembly 14, then the teeth 22 provided as part of the lower locking ring 20 are above the teeth 60 on the upper locking ring 58 and the maximum diametrical dimension of the teeth 22 is sufficiently greater than the minimal diametrical dimension of the teeth 60 that only the slighest relative vertical movement between the two modules is permitted as the monitor module is swiveled about the vertical axis Z for the 180° of permitted rotation between the first and second stop means.

Although the invention has been described in detail with respect to a specific presently preferred embodiment thereof, it should be understood that the invention has broad applicability and that its scope should be deemed limited only by the following appended claims.

What is claimed is:

1. In a cathode ray tube terminal having a base module and a monitor module, a swivel connector assembly for effecting the mechanical and electrical interconnection of said monitor module to said base module, said swivel connector assembly comprising:
   a plateau portion defined in an upper surface of said base module;
   first electrical connecting means mounted on said plateau portion;
   a first circular locking ring having a first plurality of horizontally projecting teeth defined in said upper surface and surrounding said plateau portion;
   a recessed portion defined in a lower surface of said monitor module;
   second electrical connecting means mounted within said recessed portion and adapted to interconnect with said first electrical connecting means;
   swivel support means for permitting said monitor module to be supported on said base module and to be swiveled about a swivel axis from a first position through a second position to a third position, said swivel axis extending upwardly from said plateau portion to said recess portion;
   a second circular locking ring having a second plurality of horizontally projecting teeth projecting in a direction radially opposite to that of said first plurality of horizontally projecting teeth and adapted to be lockingly engageable therewith as said monitor module is supported on said base module and swiveled about said swivel axis from said first position to said second position;
   first fixed stop means associated with said first position for limiting further swiveling beyond said first position in a first rotational direction from said second and third positions to said first position;
   second fixed stop means associated with said third position for limiting further swiveling beyond said third position in a second rotational direction from said first and second positions to said third position;
   movable stop means associated with said second position, said movable stop means having displaced condition at which swiveling in said second rotational direction is permitted from said first position to said third position and a normal condition at which swiveling in said second direction from said first position is limited to said second position;
   means for permitting at least one of said first and second electrical connecting means to rotate with respect to the respective one of said monitor and base modules to which it is mounted; and
   said first fixed stop means and said movable stop means cooperating to define a normal range of swivel motion in which at least a portion of said second plurality of teeth are always disposed vertically below an overlapping portion of said first plurality of teeth so as to mechanically couple said monitor module onto said base module, said movable stop means and said second fixed stop means defining an extended range of swivel motion including said third position at which said first and second pluralities of teeth do not so overlap.

2. The connector of claim 1 further comprising spring detent means for permitting said at least one electrical connecting means to be maintained in a predetermined positional relationship relative to its mounting such that said first and second connecting means are in an aligned relationship with respect to one another when said monitor module is at said third position relative to said base module but mechanically separated therefrom and said first and second connecting means are disengaged from each other.

3. In a cathode ray tube terminal having a base module and a monitor module, a swivel connector assembly for effecting the mechanical and electrical interconnection of said monitor module to said base module, said swivel connector assembly comprising:
   a plateau portion defined in an upper surface of said base module;
   first electrical connecting means mounted on said plateau portion;
   a first circular locking ring having a first plurality of horizontally projecting teeth defined in said upper surface and surrounding said plateau portion;
   a recessed portion defined in a lower surface of said monitor module;

second electrical connecting means mounted within said recessed portion and adapted to interconnect with said first electrical connecting means;

swivel support means for permitting said monitor module to be supported on said base module and to be swiveled about a swivel axis between first, second and third positions, said swivel axis extending upwardly from said plateau portion to said recess portion;

a second circular locking ring having a second plurality of horizontally projecting teeth projecting in a direction radially opposite to that of said first plurality of horizontally projecting teeth and adapted to be lockingly engageable therewith as said monitor module is supported on said base module and swiveled about said swivel axis from said first position to said second position;

movable stop means having a normal condition in which the monitor module may be swiveled between said first and second positions, and a displaced condition in which the monitor module may be swiveled from said first position through said second position to said third position;

first fixed stop means including means projecting from one of said modules at a location radially beyond said rings for preventing the monitor module from swiveling beyond said first position when the monitor module is swiveled in a first direction;

second fixed stop means including means projecting from one of said modules at a location radially beyond said rings for preventing the monitor module from swiveling beyond said second position when the monitor module is swiveled in a second direction and the movable stop means is in its normal condition;

third stop means including means projecting from one of said modules at a location radially beyond said rings for preventing the monitor module from swiveling beyond said third position when the monitor module is swiveled in said second direction and the movable stop means is in its displaced condition;

means for permitting at least one of said first and second electrical connecting means to swivel with respect to the respective one of said monitor and base modules to which it is mounted;

a plurality of aligning pins attached to said modules for guiding the first electrical connecting means into engagement with the second electrical connecting means when the monitor module and base module are pushed toward one another and have orientations such that the teeth of one locking ring fit into respective spaces between the teeth of the other locking ring;

the teeth of said locking rings being arranged so that at least a portion of each tooth of one locking ring is disposed vertically below a corresponding tooth of the other locking ring to mechanically couple the monitor module to the base module when the monitor module is in any position between said first and second positions, and so that the teeth of one locking ring fit into respective spaces between the teeth of the other locking ring when the monitor module is in said third position.

4. The terminal of claim 3 in which the monitor module assumes said first position when the projecting means of the first stop means is in contact with the movable stop means and assumes said second position when the projecting means of the second stop means in in contact with the movable stop means.

5. The terminal of claim 3 in which the movable stop means comprises a generally planar finger which lies in a plane that is approximately parallel to the planes of said rings.

6. The terminal of claim 5 in which the monitor module and said finger include index marks which become aligned with one another when the monitor module is in said third position.

7. The terminal of claim 5 including a resilient hinge for attaching said finger to one of said modules, rotation about said hinge serving to establish the normal and displaced conditions of said movable stop means.

8. The terminal of claim 3 in which the positions of the projecting means of the first and second stop means are selected to provide up to 180° of angular rotation between said first and second positions.

9. The terminal of claim 3 in which at least one tooth of each locking ring has an angular size which is unequal to that of the other teeth of that locking ring.

* * * * *